US011826968B2

United States Patent
Blaise et al.

(10) Patent No.: US 11,826,968 B2
(45) Date of Patent: Nov. 28, 2023

(54) METHOD FOR PRODUCING AN ANNULAR CASING FOR AN AIRCRAFT TURBINE ENGINE

(71) Applicant: SAFRAN AIRCRAFT ENGINES, Paris (FR)

(72) Inventors: Maxime Marie Désiré Blaise, Moissy-Cramayel (FR); Hubert Jean Marie Fabre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 5 days.

(21) Appl. No.: 17/637,122

(22) PCT Filed: Aug. 24, 2020

(86) PCT No.: PCT/FR2020/051493
§ 371 (c)(1),
(2) Date: Feb. 22, 2022

(87) PCT Pub. No.: WO2021/038164
PCT Pub. Date: Mar. 4, 2021

(65) Prior Publication Data
US 2022/0339889 A1 Oct. 27, 2022

(30) Foreign Application Priority Data
Aug. 28, 2019 (FR) ...................... 1909462

(51) Int. Cl.
*B29C 70/34* (2006.01)
*B29C 70/22* (2006.01)
(Continued)

(52) U.S. Cl.
CPC ............ *B29C 70/34* (2013.01); *B29C 70/222* (2013.01); *B29C 70/54* (2013.01); *B29L 2031/3076* (2013.01)

(58) Field of Classification Search
CPC .................................................. B29C 70/345
See application file for complete search history.

(56) References Cited

U.S. PATENT DOCUMENTS 5,605,745 A * 2/1997 Recker ..................... C08J 5/243
442/175
8,282,757 B2 * 10/2012 Madsen .................. B29C 70/32
156/441
(Continued)

FOREIGN PATENT DOCUMENTS

| CN | 101209591 A | * | 7/2008 |
| EP | 2017072 A1 | * | 1/2009 |
| WO | 2019013239 A1 | | 1/2019 |

OTHER PUBLICATIONS

Written Opinion of the International Searching Authority dated Dec. 2, 2020, issued in corresponding International Patent Application No. PCT/FR2020/051493, filed on Aug. 24, 2020, 7 pages.
(Continued)

*Primary Examiner* — Jeffry H Aftergut
(74) *Attorney, Agent, or Firm* — Christensen O'Connor Johnson Kindness PLLC

(57) ABSTRACT

Methods for producing an annular casing for an aircraft turbine engine are provided. The annular casing includes an annular body made from a composite material based on a first resin, and a fire-resistant outer layer which covers an external annular surface of the body and which is made from a composite material based on a self-extinguishing second resin. The method includes preparing a strip of a glass fabric preimpregnated with said second resin, this strip including woven fibres oriented in directions that are perpendicular to one another and inclined by an angle of approximately 45° with respect to the axis of elongation of the strip, and
(Continued)

applying the strip to the external surface of the body so as to cover the entirety of this surface in a single pass of the strip around the body.

10 Claims, 3 Drawing Sheets

(51) Int. Cl.
   *B29C 70/54* (2006.01)
   *B29L 31/30* (2006.01)

(56) References Cited

U.S. PATENT DOCUMENTS

| | | | |
|---|---|---|---|
| 2009/0022579 A1 | 1/2009 | Schlichting et al. | |
| 2009/0098284 A1* | 4/2009 | Xie | B29C 70/32 427/177 |
| 2009/0098337 A1 | 4/2009 | Xie et al. | |
| 2015/0239181 A1 | 8/2015 | Corradini et al. | |
| 2016/0327061 A1* | 11/2016 | Mandel | B29C 65/02 |
| 2016/0333789 A1* | 11/2016 | Corradini | F02C 7/25 |

OTHER PUBLICATIONS

International Preliminary Report on Patentability dated Mar. 1, 2022, issued in corresponding International Patent Application No. PCT/FR2020/051493, filed on Aug. 24, 2020, 1 page.

English Translation of the Written Opinion of the International Searching Authority dated Dec. 2, 2020, issued In corresponding International Patent Application No. PCT/FR2020/051493, filed on Aug. 24, 2020, 3 pages.

English Translation of the International Search Report dated Dec. 2, 2020, issued in corresponding International Patent Application No. PCT/FR2020/051493, filed on Aug. 24, 2020, 2 pages.

* cited by examiner

[Fig.1]
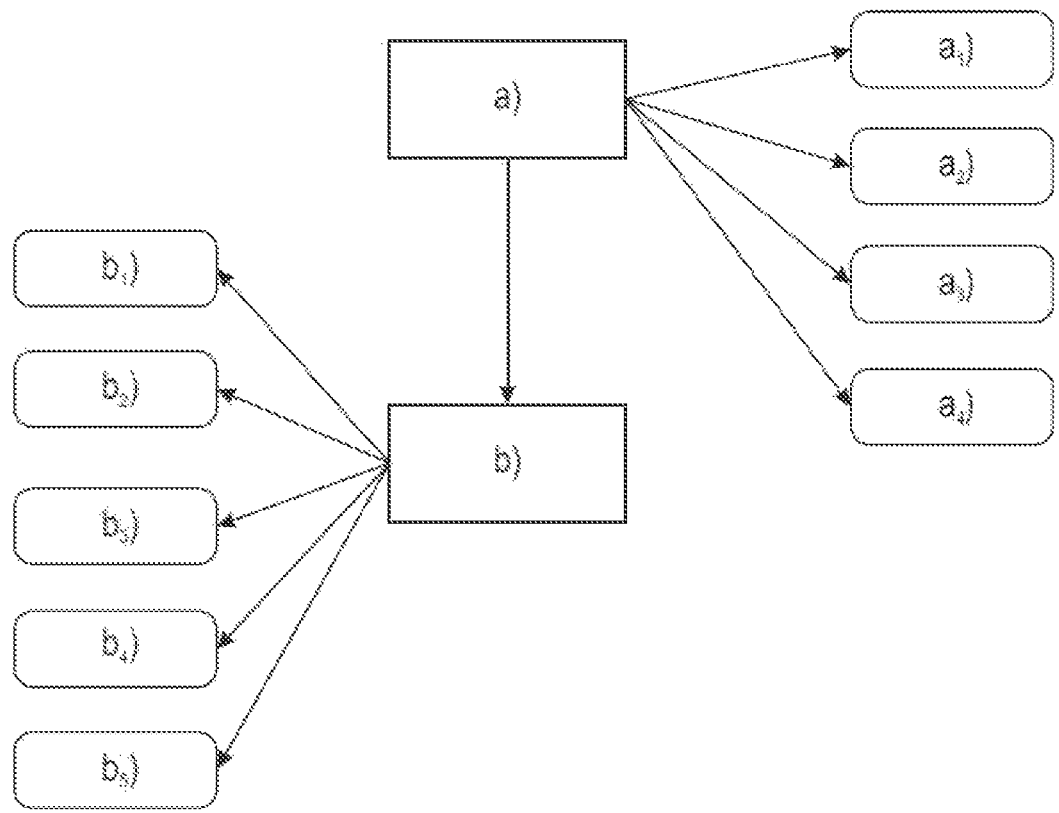
[Fig.2]
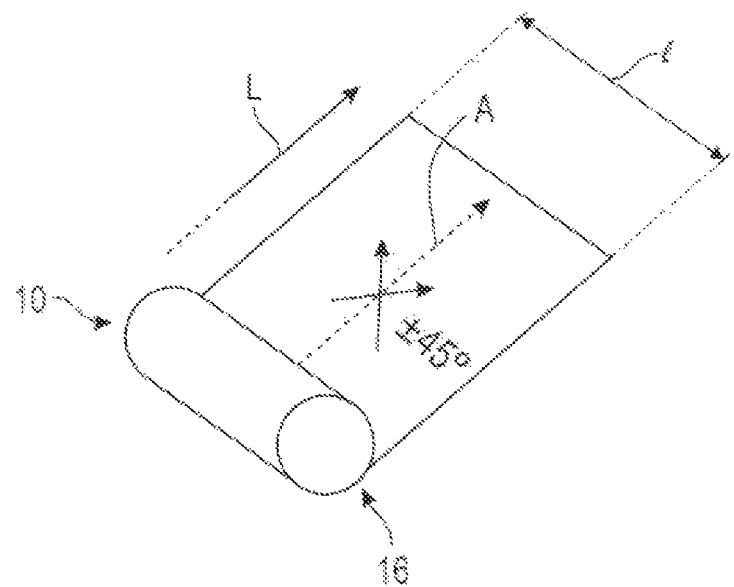

[Fig.3]
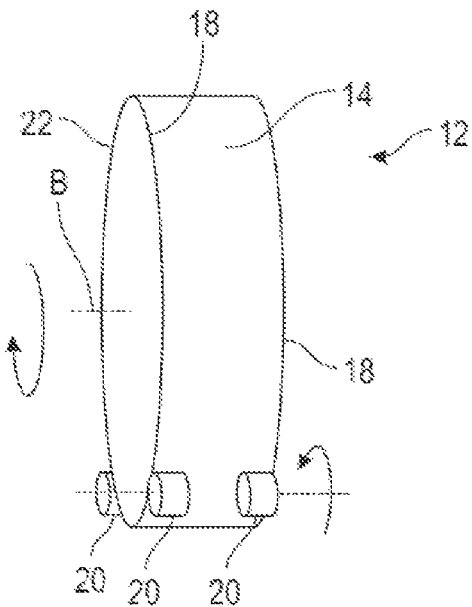
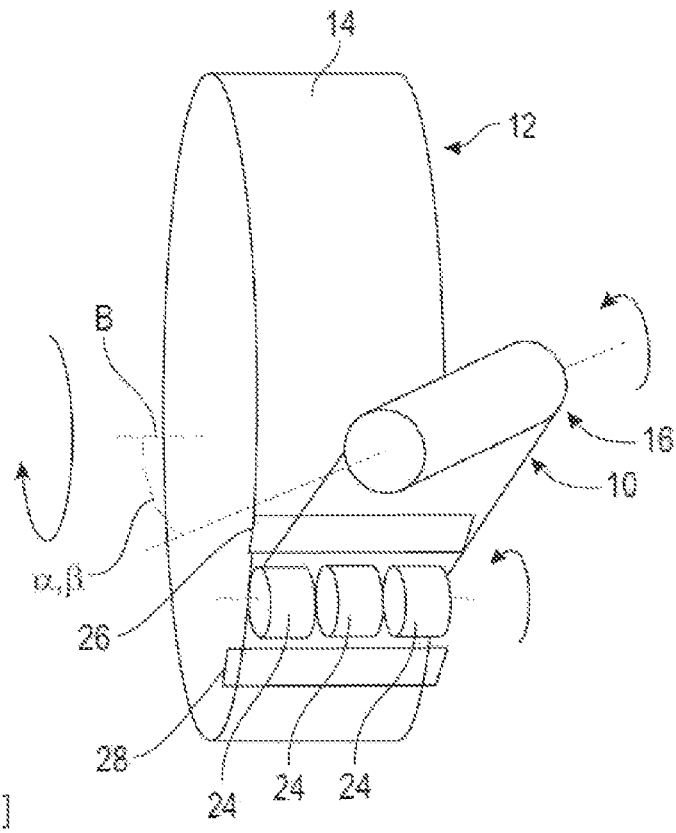
[Fig.4]

[Fig.5]
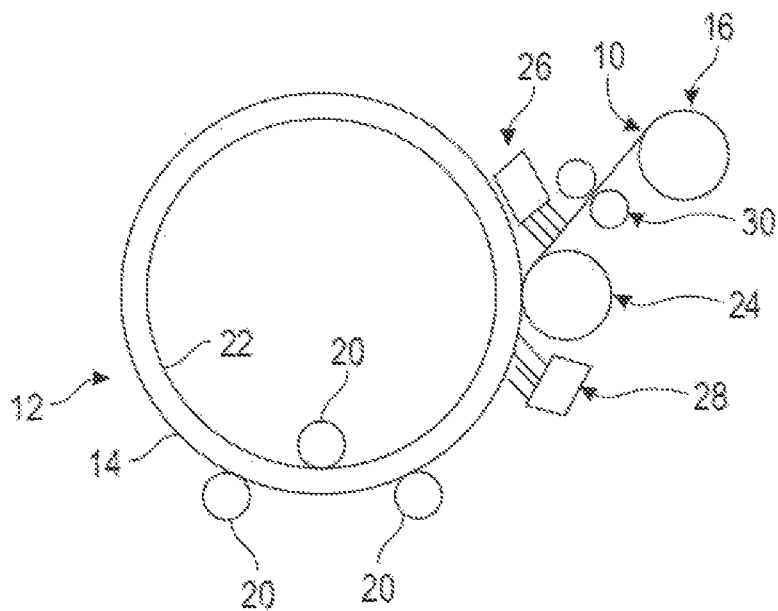
[Fig.6]
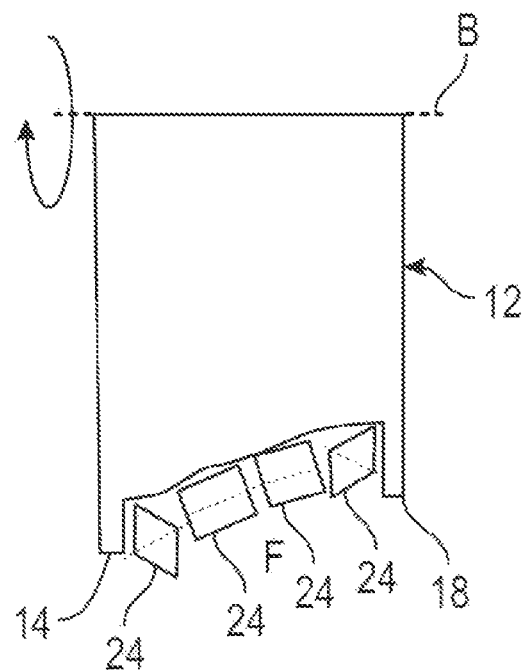

METHOD FOR PRODUCING AN ANNULAR CASING FOR AN AIRCRAFT TURBINE ENGINE

CROSS-REFERENCES TO RELATED APPLICATIONS

This application is a National Stage of International Application No. PCT/FR2020/051493, filed Aug. 24, 2020, which claims priority to French Patent Application No. 1909462, filed Aug. 28, 2019, the entire disclosures of which are hereby incorporated by reference.

TECHNICAL FIELD OF THE INVENTION

The present invention relates to a method for producing an annular casing for an aircraft turbine engine.

BACKGROUND

The technical background comprises in particular the documents US-A1-2009/022579 and US-A1-2015/239181.

An aircraft turbine engine comprises several annular casings. To lighten a casing, it is known to make it out from a composite material. In the present application, a composite material is defined as a material comprising fillers such as fibres embedded in a polymeric matrix. The polymeric matrix is usually a resin.

A fan casing can be made from composite material, for example. This casing surrounds the fan of the turbine engine and must meet the specifications necessary for its certification, in particular with regard to its fire resistance.

The resin used to produce the fan casing is chosen for its mechanical properties but is flammable in the current art and it is therefore necessary to cover the upper surface of the casing with a fire-resistant layer.

Solutions exist but are not entirely satisfactory, in particular because they are long and complex to implement.

The invention proposes to remedy this drawback.

SUMMARY OF THE INVENTION

The invention thus proposes a method for producing an annular casing for an aircraft turbine engine, this casing comprising an annular body made from a composite material based on a first resin, and a fire-resistant external layer which covers an external annular surface of the body and which is made from a composite material based on a self-extinguishing second resin, characterised in that it comprises:
  a) a step of preparing a strip of a fabric pre-impregnated with said second resin, said strip having an elongated shape along an axis of elongation and a width at least equal to and preferably greater than a width of said body measured along its axis of revolution, this strip comprising fibres woven and oriented in directions perpendicular to one another and inclined by an angle of about 45° with respect to said axis of elongation, and
  b) a step of applying the strip on the external surface of the body, so as to cover the entirety of this surface in a single pass of the strip around the body.

The invention proposes to use a self-extinguishing resin and to pre-impregnate a fabric strip with this resin which is then deposited all around the body of the casing.

The strip is made by weaving glass or carbon fibres for example. These fibres are oriented in particular directions that will facilitate the shifting of the strip when it is placed on the body.

Indeed, the external surface of the body of the casing may have a marked relief. When applying the strip, it is important that the strip follows this relief without creating air bubbles for example. The fibres oriented at 90° to each other and at 45° to the elongation axis of the strip will slide more easily over each other and will facilitate the shifting of the strip.

The body is advantageously surrounded by a single strip. This strip extends all around the body and is advantageously at least as wide as the body. Alternatively, the strip could be formed by several adjacent annular sections, in particular if the surface of the external surface of the casing has a double curvature or is of the bi-conical type.

The invention also allows to help to fight against the galvanic corrosion of the casing when it is made in a composite/metal assembly.

The method according to the invention may comprise one or more of the following characteristics, taken independently or in combination with each other:
  the strip is wound into a roll at the end of the step a), this roll is arranged on one side of the body in the step b), and the body and the roll are rotated about their respective axes during the step b);
  the body is rotated in the step b) by means of rollers resting on the external surface and/or on an internal surface of the body;
  in the b), the axis of rotation of the roll is inclined by a predetermined angle with respect to at least one plane passing through the axis of revolution of the body;
  in the b), at least one compaction roll is used to apply the strip to the external surface of the body;
  a plurality of compaction rolls are distributed along the axis of revolution of the body and have profiles complementary to the relief of the external surface of the body;
  the compaction rolls each comprise at least one external annular layer of foam, the foam layers of at least some of the rolls having different stiffnesses;
  in the step b), parameters are controlled and comprise a tension of the strip in said direction, and a contact pressure of the or each compaction roll;
  heating elements, such as infrared lamps, plasma or laser torches, etc., are arranged upstream and downstream of said at least one compaction roll, with respect to the winding direction of the strip on the body;
  film unwinders are arranged under and on the strip as it is unwound, these unwinders being configured to remove protective films present on both faces of the strip.

BRIEF DESCRIPTION OF FIGURES

Further characteristics and advantages of the invention will become apparent from the following detailed description, for the understanding of which reference is made to the attached drawings in which:

FIG. 1 is a flowchart showing steps of a method according to the invention,

FIG. 2 is a very schematic perspective view of a strip of pre-impregnated fabric used in the method according to the invention, FIG. 3 is a very schematic perspective view of a casing body and rollers for rotating this body, for the implementation of the method according to the invention, FIG. 4 illustrates schematically a step of the method according to the invention, FIG. 5 illustrates schematically the step of the method of FIG. 4, and FIG. 6 is a very schematic partial view in axial section of a casing and compaction rolls, for the implementation of the method according to the invention.

DETAILED DESCRIPTION OF THE INVENTION

FIG. 1 represents in a very schematic way the steps of a method according to the invention for producing an annular casing for an aircraft turbine engine.

This casing is for example a fan casing.

The method essentially comprises two steps, namely a step a) of preparing a strip of pre-impregnated fabric 10 (FIG. 2), and a step b) of applying this strip 10 to the external surface 14 of a body 12 of the casing (FIGS. 4 and 5).

The first step a) of producing the strip 10 can be divided into several successive sub-steps. It can comprise a first sub-step a1) of producing the fabric strip. For this purpose, a loom can be used, for example, to make the fabric strip from fibres, preferably glass. The glass fibres form weft and warp threads of the fabric and are intended to be oriented at 90° from each other and at about 45° to an axis of elongation A of the strip, as schematically illustrated in FIG. 2.

The strip 10 has a width e and a length L and its length (largest dimension) extends along the elongation axis A.

The first step a) can comprise another sub-step a2) of impregnating the strip with a self-extinguishing resin which is for example the M26T® resin marketed by the company Hexcel. The first step a) can comprise another sub-step a3) of placing a protective film on each of the faces of the strip. Finally, in another sub-step a4), the strip 10 can be wound on itself or on an axis to form a roll 16 that is easier to handle (FIG. 2).

Similarly, the second step b) may comprise several successive sub-steps.

The first sub-step b1) is to rotate the body 12 of the casing, as shown in FIG. 3. The body 12 is made from a composite material based on a resin different from the resin for impregnating the strip. The resin of the body 12 is chosen for its mechanical properties and can be the CYCOM® PR 520 resin marketed by the Solvay company (formerly Cytec). The body 12 of the casing has a generally annular shape about an axis of revolution B and may comprise an annular flange 18 for attachment at each of its axial ends.

The body 12 of the casing is rotated by means of rollers in FIG. 3. For this purpose, the body 12 can be arranged on rollers 20 which rest on the external surface 14 of the body. Rollers 20 can also be arranged inside the body and rest on an internal surface 22 of the body. The rollers 20 are motorized so as to control the speed of rotation of the casing body 12.

In the present application, the terms internal and external or inner and outer are understood to mean positions relative to the axis B of revolution of the casing or of its body 14.

During the second step b), the strip roll 16 is arranged next to the rotatable body 12. The roll 16 is itself rotated (sub-step b2)) about its axis to unwind the strip 10 and apply it with some tension to the external surface 14 of the body 12. The roll 16 is mounted on a motorized unwinder so as to control its rotation speed.

As can be seen in the drawings, the width e of the strip 10 is preferably greater than the width of the body 12. It is therefore understood that a single pass of the strip 10 around the body 12 is sufficient to cover the entire external surface 14 of the body.

In the example shown, the body 12 of the casing and the roll 16 rotate in opposite directions.

In the example shown in FIG. 4, the axis of the roll 16 is inclined by a first predetermined angle α with respect to a horizontal plane passing through the axis B and by a second predetermined angle β with respect to a vertical plane passing through that axis B.

FIG. 4 further allows to show that this inclination allows, for example, to accentuate the tension of the strip 10 on one side, for example the upstream side of the casing, compared to the downstream side, in order to facilitate the shifting of the strip.

The unwound strip 10 extends from the roll 16 to the external surface 14 of the body 12 of the casing and is pressed onto this surface by means of compaction rolls 24.

Advantageously, the compaction rolls 24 extend along the axis B and have profiles complementary to the relief of the external surface 14 of the body 12 (FIG. 6).

The pressures F exerted by the rolls 24 on the strip 10 and the body 12 are preferably managed and adjusted independently of each other (sub-step b3)). The compaction rolls 24 each comprise at least one external annular layer of foam. The foam layers of at least some of the rolls 24 preferably have different stiffnesses.

The foams allow the rolls 24 to adapt to the changing shape of the body 12 and to the resulting rate of shifting. They are, for example, shaped like the radii of the flanges 18 at both ends of the body 12 to allow draping into the bottom of the radii of these flanges. The parameters of tension of the strip 10 and contact pressure of the compaction rolls 24 can be controlled.

Infrared lamps 26, 28 are arranged upstream and downstream of the compaction rolls, with respect to the winding direction of the strip 10 on the body 12. The upstream lamp 26 allows to heat the strip 10 before it is placed and the downstream lamp 28 allows to heat the strip 10 and the body 12 simultaneously. This allows to facilitate the adhesion of the strip to the external surface 14 of the body 12 (sub-step b4)).

Film unwinders 30 are arranged under and on top of the strip 10 as it is unwound. These unwinders 30 are configured to remove the protective films present on both faces of the strip, prior to its application to the body 12 of the casing (sub-step b5)).

The invention claimed is:

1. A method for producing an annular casing for an aircraft turbine engine, the annular casing comprising an annular body made from a first composite material based on a first resin, and a fire-resistant external layer which covers an external annular surface of the annular body and which is made from a second composite material based on a self-extinguishing second resin, the method comprising the steps of:
   a) preparing a strip of a fabric pre-impregnated with said second resin, the strip having an elongated shape along an axis of elongation and a width at least equal to a width of said annular body measured along its axis of revolution, the strip comprising fibres woven and oriented in directions perpendicular to one another and inclined by an angle of about 45° with respect to said axis of elongation;
   b) applying and winding the strip on the external surface of the annular body, after forming said annular body, so as to entirely cover the external surface in a single pass of the strip around the annular body, wherein at least one compaction roll is used to apply the strip to the external surface of the annular body; and c) arranging heating elements upstream or downstream of said at least one compaction roll with respect to a winding direction of the strip on the annular body, wherein said second resin is different from the first resin.

2. The method according to claim 1, wherein the strip is wound and is in a form of a roll at an end of the step a), the roll being arranged on one side of the annular body in the step b), and the annular body and the roll being rotated about their respective axes during the step b).

3. The method according to claim 2, wherein the annular body is rotated in step b) by rollers resting on at least one of the external surface or on an internal surface of the annular body.

4. The method of claim 2, wherein in the step b), an axis of rotation of the roll is inclined by a predetermined angle with respect to at least one plane passing through the axis of revolution of the annular body.

5. The method according to claim 1, wherein a plurality of compaction rolls comprising the at least one compaction roll is distributed along the axis of revolution of the annular body and wherein the compaction rolls of the plurality of compaction rolls have profiles complementary to a relief of the external surface of the annular body.

6. The method of claim 5, wherein each compaction roll of the plurality of compaction rolls comprises at least one external annular layer of foam, the foam layers of at least some of the compaction rolls of the plurality of compaction rolls having different stiffnesses.

7. The method of claim 5, wherein in the step b), a plurality of parameters are controlled, wherein the plurality of parameters comprises a tension of the strip, and a contact pressure of each compaction roll of the plurality of compaction rolls.

8. The method according to claim 1, wherein film unwinders are arranged under and on the strip as it is unwound, said unwinders being configured to remove protective films present on a first face and an opposite second face of the strip.

9. The method for producing an annular casing for an aircraft turbine engine, the annular casing comprising an annular body made from a first composite material based on a first resin, and a fire-resistant external layer which covers an external annular surface of the annular body and which is made from a second composite material based on a self-extinguishing second resin, the method comprising:

a) preparing a strip of a fabric pre-impregnated with said second resin, the strip having an elongated shape along an axis of elongation and a width at least equal to a width of said annular body measured along its axis of revolution, the strip comprising fibres woven and oriented in directions perpendicular to one another and inclined by an angle of about 45° with respect to said axis of elongation; and b) applying the strip on the external surface of the annular body, so as to entirely cover the external surface in a single pass of the strip around the annular body, wherein the strip is wound and is in a roll at an end of the step a), the roll being arranged on one side of the annular body in the step b), and the annular body and the roll being rotated about their respective axes during the step b), and wherein in the step b), an axis of rotation of the roll is inclined by a predetermined angle with respect to at least one plane passing through the axis of revolution of the annular body.

10. A method for producing an annular casing for an aircraft turbine engine, the annular casing comprising an annular body made from a first composite material based on a first resin, and a fire-resistant external layer which covers an external annular surface of the annular body and which is made from a second composite material based on a self-extinguishing second resin, the method comprising:

a) preparing a strip of a fabric pre-impregnated with said second resin, the strip having an elongated shape along an axis of elongation and a width at least equal to a width of said annular body measured along its axis of resolution, the strip comprising fibres woven and oriented in directions perpendicular to one another and inclined by an angle of about 45° with respect to said axis of elongation; and b) applying the strip on the external surface of the annular body, so as to entirely cover the external surface in a single pass of the strip around the annular body, wherein in the step b), at least one compaction roll is used to apply the strip to the external surface of the annular body, wherein a plurality of compaction rolls comprising the at least one compaction roll is distributed along the axis of revolution of the annular body and wherein the compaction rolls of the plurality of compaction rolls have profiles complementary to a relief of the external surface of the annular body, and wherein each compaction roll of the plurality of compaction rolls comprises at least one external annular layer of form, the foam layers of at least some of the compaction rolls of the plurality of compaction rolls having different stiffnesses.

* * * * *